(12) United States Patent
Zhang et al.

(10) Patent No.: US 11,316,765 B2
(45) Date of Patent: Apr. 26, 2022

(54) LOAD BALANCING ACROSS BANDWIDTH CARRYING CIRCUITS

(71) Applicant: KYNDRYL, INC., New York, NY (US)

(72) Inventors: Guo Dong Zhang, Beijing (CN); Chen Bo Li, Beijing (CN); Hsiulan Chen, Beijing (CN); Jing Jie Wang, Beijing (CN); Jiang Zhu, Beijing (CN)

(73) Assignee: KYNDRYL, INC., New York, NY (US)

( * ) Notice: Subject to any disclaimer, the term of this patent is extended or adjusted under 35 U.S.C. 154(b) by 133 days.

(21) Appl. No.: 16/788,549

(22) Filed: Feb. 12, 2020

(65) Prior Publication Data

US 2021/0250263 A1  Aug. 12, 2021

(51) Int. Cl.
*H04L 12/26* (2006.01)
*H04L 43/0811* (2022.01)
(Continued)

(52) U.S. Cl.
CPC ...... *H04L 43/0811* (2013.01); *H04L 43/0876* (2013.01); *H04L 43/12* (2013.01); *H04L 47/125* (2013.01); *H04L 47/805* (2013.01)

(58) Field of Classification Search
CPC . H04L 43/0811; H04L 43/0876; H04L 43/12; H04L 47/805; H04L 47/125
See application file for complete search history.

(56) References Cited

U.S. PATENT DOCUMENTS

| 7,177,649 | B1 * | 2/2007 | Nielsen | H04W 48/20 370/332 |
| 8,553,861 | B1 * | 10/2013 | Singh | H04M 15/00 379/112.1 |

(Continued)

FOREIGN PATENT DOCUMENTS

| CN | 109391640 A | 2/2019 |
| CN | 109525414 A | 3/2019 |

OTHER PUBLICATIONS

Gajbhiye et al., "Global Server Load Balancing with Networked Load Balancers for Geographically Distributed Cloud Data-Centres", IJCSN—International Journal of Computer Science and Network, vol. 6, Issue 6, Dec. 2017 ISSN (Online): 2277-5420, www.IJCSN.org, 8 pps., Impact Factor: 1.5 <https://www.researchgate.net/publication/321483922_>.

*Primary Examiner* — Michael A Keller
*Assistant Examiner* — Jsing Forng Lin
(74) *Attorney, Agent, or Firm* — Erik Swanson; Andrew M. Calderon; Roberts Calderon Safran & Cole, P.C.

(57) ABSTRACT

Aspects of the present invention disclose a method, computer program product, and system for dynamic load balancing of user traffic across Internet circuits based on monitored loads of the circuits. The method includes one or more processors receiving a request to utilize an Internet-accessible resource from a first user. The method further includes one or more processors identifying a communications service provider (CSP) that is associated with the user. The method further includes one or more processors determining a real-time load on a first Internet uplink circuit that is provisioned to the first CSP. In response to determining that the real-time load on the first Internet uplink circuit does meet a threshold condition, the method further includes one or more processors distributing traffic corresponding to (Continued)

executing the received request to utilize the Internet-accessible resource to a second Internet uplink circuit that is provisioned to a second CSP.

20 Claims, 5 Drawing Sheets

(51) Int. Cl.
*H04L 43/0876* (2022.01)
*H04L 47/80* (2022.01)
*H04L 47/125* (2022.01)
*H04L 43/12* (2022.01)

(56) References Cited

U.S. PATENT DOCUMENTS

| | | | |
|---|---|---|---|
| 9,775,008 B2* | 9/2017 | Patel | H04L 41/12 |
| 2005/0071469 A1* | 3/2005 | McCollom | H04L 67/1002 |
| | | | 709/225 |
| 2011/0173339 A1* | 7/2011 | Zhang | H04L 67/1002 |
| | | | 709/229 |
| 2014/0269332 A1* | 9/2014 | Senarath | H04L 45/125 |
| | | | 370/238 |
| 2017/0085629 A1* | 3/2017 | Mahapatra | H04L 45/60 |
| 2018/0115487 A1* | 4/2018 | Thubert | H04L 65/60 |
| 2019/0253274 A1* | 8/2019 | Van Dussen | H04L 43/12 |
| 2020/0204483 A1* | 6/2020 | Jain | H04L 49/25 |

* cited by examiner

LOAD BALANCING ACROSS BANDWIDTH CARRYING CIRCUITS

BACKGROUND OF THE INVENTION

The present invention relates generally to the field of network communications, and more particularly to network load balancing.

A telecommunications network is a collection of terminal nodes in which links are connected so as to enable telecommunication between the terminals. Transmission links connect the nodes together. The nodes use circuit switching, message switching or packet switching to pass the signal through the correct links and nodes to reach the correct destination terminal. Each terminal in the network usually has a unique address so messages or connections can be routed to the correct recipients. The collection of addresses in the network is called the address space. Examples of telecommunications networks include computer networks, the Internet, telephone networks, etc. The Internet is the global system of interconnected computer networks that uses the Internet protocol suite (TCP/IP) to link devices worldwide.

A communications service provider (CSP) is a service provider that transports information electronically, such as a telecommunications service provider. For example, a CSP can encompass public and private companies in the telecom (landline and wireless), Internet, cable, satellite, and managed services businesses. The market in which a communications service provider specializes is often a function of the industry served. These industries can be divided into three categories: telecommunications, entertainment and media, and Internet/Web services. Some communications service providers have branched into multiple areas. Others provide communications services across all major categories.

SUMMARY

Aspects of the present invention disclose a method, computer program product, and system for dynamic load balancing of user traffic across Internet circuits based on monitored loads of the circuits. The method includes one or more processors receiving a request to utilize an Internet-accessible resource from a first user. The method further includes one or more processors identifying a communications service provider (CSP) that is associated with the user. The method further includes one or more processors determining a real-time load on a first Internet uplink circuit that is provisioned to the first CSP. The method further includes one or more processors determining whether the real-time load on the first Internet uplink circuit meets a threshold condition. In response to determining that the real-time load on the first Internet uplink circuit does meet a threshold condition, the method further includes one or more processors distributing traffic corresponding to executing the received request to utilize the Internet-accessible resource to a second Internet uplink circuit that is provisioned to a second CSP.

DETAILED DESCRIPTION

Embodiments of the present invention allow for dynamic load balancing of user traffic across Internet circuits based on monitored loads of the circuits. In response to receiving a request from a user, embodiments of the present invention identify a corresponding communication service provider (CSP) uplink circuit. For example, a user request can be a user-initiated request to access cloud storage from a mobile computing device. Embodiments of the present invention can then determine whether a load on the corresponding CSP uplink circuit exceeds a maximum load threshold. In response to determining that the load does not exceed the maximum load threshold, embodiments of the present invention can facilitate execution of the request.

In response to determining that the load does exceed the maximum load threshold, embodiments of the present invention can identify and alternate CSP uplink circuit and allocate execution of the request to the identified alternate CSP uplink circuit. Accordingly, embodiments of the present invention can orchestrate user traffic from one CSP circuit to another CSP circuit based on different monitored conditions, such as circuit load, quality of the circuit, bandwidth allocation, etc.

Some embodiments of the present invention recognize that a hosting data center (e.g., Internet serving data center) often include multiple uplink circuits (i.e., Internet uplink circuits) for different carriers (i.e., CSPs, such as telecommunications providers, Internet service providers, etc.). The hosting data center can operate to distribute the user requests to the corresponding uplink circuits, based on the CSP of the user. Embodiments of the present invention recognize that the Internet uplink circuits can experience unexpected spikes in usage in load, which can significantly reduce available bandwidth and connectivity speed for users of the CSP.

In addition, embodiments of the present invention recognize that technology is available to distribute user requests from different CSPs based on public Internet Protocol (IP) addresses of requesting users, based on identifying the originating CSP compared to IP address databases. However, embodiments of the present invention also recognize that distribution of user requests purely based on the corresponding CSP can fail to react to situations where the Internet uplink circuits of one CSP is congested, while another Internet uplink circuit of another CSP is being lightly utilized (i.e., low load). Such a scenario can reduce a user's ability to reach requested services, despite existing connections that have the ability to serve the user traffic (i.e., an alternate carrier circuit).

Implementation of embodiments of the invention may take a variety of forms, and exemplary implementation details are discussed subsequently with reference to the Figures.

Figure 1:
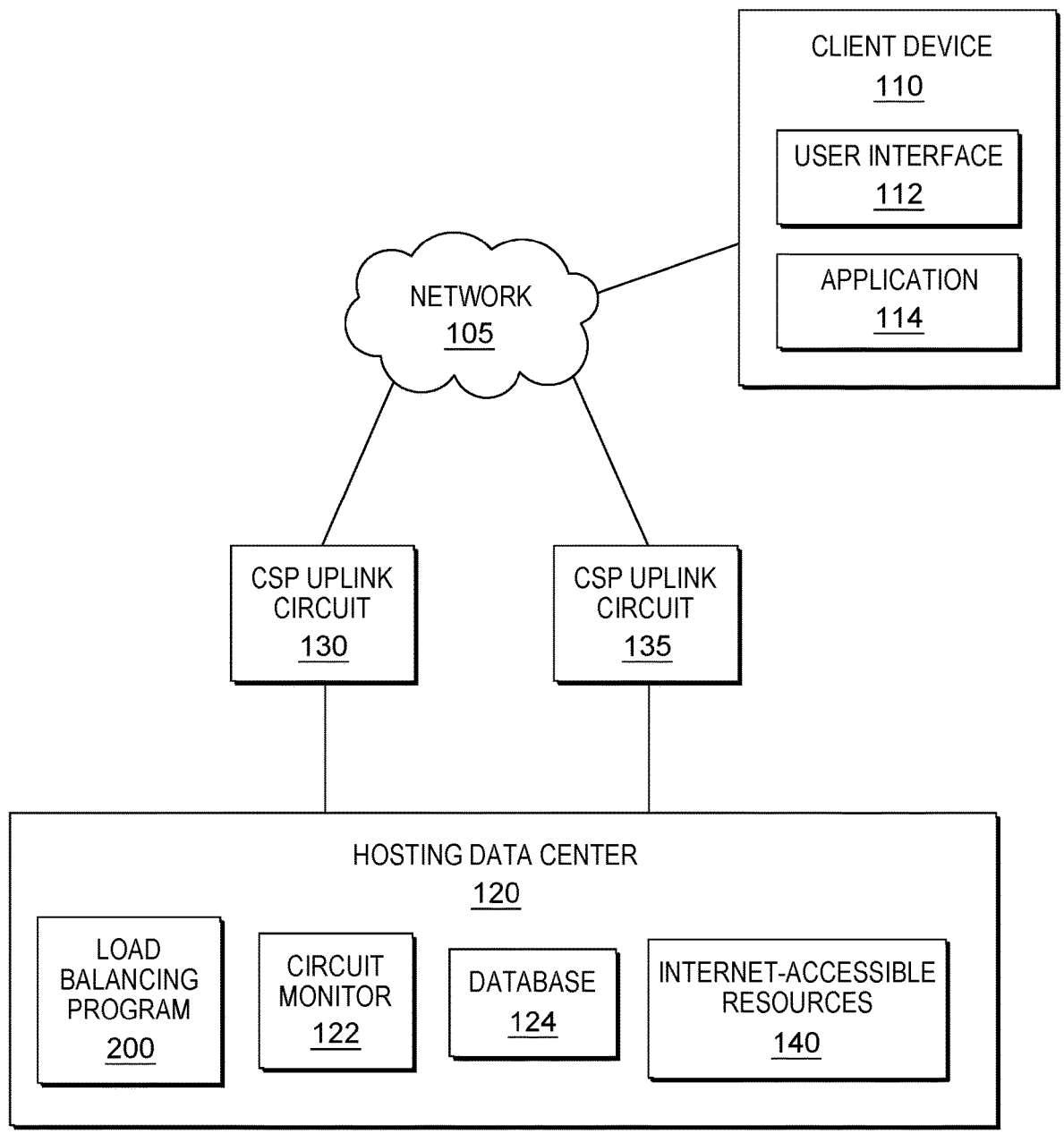
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, hosting data center 120, CSP uplink circuit 130, and CSP uplink circuit 135, all interconnected over network 105. In an example embodiment, a user can utilize client device 110 to request access and/or use of content (e.g., in Internet-accessible resources 140). In this example embodiment, hosting data center 120 facilitates execution of the request via at least one of CSP uplink circuit 130 and CSP uplink circuit 135, in accordance with embodiments of the present invention. For example, an individual utilizing client device 110 requests to access a cloud storage application (i.e., access content in Internet-accessible resources 140).

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, hosting data center 120, CSP uplink circuit 130, and CSP uplink circuit 135, in accordance with embodiments of the present invention. In various embodiments, network 105 facilitates communication among a plurality of networked computing devices (e.g., client device 110 and hosting data center 120), corresponding users (e.g., an individual client device 110), network communications infrastructure (e.g., CSP uplink circuit 130 and CSP uplink circuit 135) and corresponding management services (e.g., hosting data center 120).

In various embodiments of the present invention, client device 110 may be a workstation, personal computer, personal digital assistant, mobile phone, or any other device capable of executing computer readable program instructions, in accordance with embodiments of the present invention. In general, client device 110 are representative of any electronic device or combination of electronic devices capable of executing computer readable program instructions. Client device 110 may include components as depicted and described in further detail with respect to FIG. 3, in accordance with embodiments of the present invention. In example embodiments, client device 110 can a smartphone or personal computer. In various embodiments, client device 110 is associated (e.g., registered with, subscribed to, etc.) with a particular CSP that hosting data center 120 services, i.e., a CSP associated with one of CSP uplink circuit 130 and CSP uplink circuit 135.

Client device 110 includes user interface 112 and application 114. User interface 112 is a program that provides an interface between a user of client device 110 and a plurality of applications that reside on the computing device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on client device 110. In an example embodiment, application 114 is a client-side application of a service or enterprise associated with a service or resource of Internet-accessible resources 140. In another example embodiment, application 114 is a web browser that an individual utilizing client device 110 utilizes (e.g., via user interface 112) to access and provide information over network 105. For example, a user of client device 110 provides input to user interface 112 to request access to cloud storage (of Internet-accessible resources 140) associated with application 114. In other aspects of the present invention, application 114 can also be representative of applications that provide additional functionality of client device 110 (e.g., camera, messaging, etc.), in accordance with various aspects of the present invention.

In example embodiments, hosting data center 120 can be a desktop computer, a computer server, or any other computer systems, known in the art. In certain embodiments, hosting data center 120 represents computer systems utilizing clustered computers and components (e.g., database server computers, application server computers, etc.) that act as a single pool of seamless resources when accessed by elements of data processing environment 100 (e.g., client device 110, CSP uplink circuit 130, CSP uplink circuit 135, and internet-accessible resources 140). In general, hosting data center 120 is representative of any electronic device or combination of electronic devices capable of executing computer readable program instructions. Hosting data center 120 may include components as depicted and described in further detail with respect to FIG. 3, in accordance with embodiments of the present invention. In a further embodiment, management hosting data center 120 can operate as one or more computing nodes in a cloud computing environment (described in further detail with regard to FIG. 4 and FIG. 5), in accordance with various embodiments of the present invention.

Hosting data center 120 includes load balancing program 200, Internet-accessible resources 140, circuit monitor 122, and database 124. In various embodiments of the present invention, hosting data center 120 can be representative of a carrier grade Internet serving data center that hosts multiple tenants and cloud services (e.g., CSPs, such as telecommunications, Internet, etc.), from which multiple Internet facing applications are services and hosted (e.g., Internet-accessible resources 140), such as cloud storage, application stores (app stores), etc. Hosting data center 120 receives requests from users (e.g., users of client device 110) and utilizes load balancing program 200 to determine which instance of CSP uplink circuit 130 or CSP uplink circuit 135 to utilize to execute the request (i.e., to carry the application traffic corresponding to the request).

In example embodiments, hosting data center 120 supports application and service traffic for at least two CSPs (i.e., a respective CSP for each of CSP uplink circuit 130 and CSP uplink circuit 135). In further embodiments, hosting data center 120 can provide support for more than two CSPs. For example, hosting data center 120 provisions one or more Internet uplink circuitry architecture to a plurality of CSPs, depicted as CSP uplink circuit 130 and CSP uplink circuit 135 in FIG. 1. In an alternate embodiment, hosting data center 120 can be representative of multiple data centers with CSP uplink circuits (i.e., multiple data center sites and/or locations).

Circuit monitor 122 operates to monitor and track utilization metrics and statistics of CSP uplink circuit 130 and CSP uplink circuit 135. For example, circuit monitor 122 monitors the real-time load (e.g., bandwidth utilization) on CSP uplink circuit 130 and CSP uplink circuit 135 and can track the corresponding statistics and metrics (e.g., in database 124). In an example embodiment, circuit monitor 122 can periodically send a bandwidth utilization probe to one or more of CSP uplink circuit 130 and CSP uplink circuit 135 (e.g., in response to receiving a request from client device 110, at defined time intervals, etc.). In various embodiments, circuit monitor 122 can collect the load and quality of user traffic traversing through CSP uplink circuit 130 and CSP uplink circuit 135 and send the collected information for storage in database 124 and/or utilization by load management program, in accordance with embodiments of the present invention.

Database 124 can be implemented with any type of storage device, for example, persistent storage 305, which is capable of storing data that may be accessed and utilized by hosting data center 120, such as a database server, a hard disk drive, or a flash memory. In other embodiments, database 124 can represent multiple storage devices and collections of data within hosting data center 120. In various embodiments, database 124 includes information that load balancing program 200 can access and utilize, in accordance with embodiments of the present invention.

In one embodiment, database 124 includes data associated with CSPs, users of CSPs, and applications and services that the CSPs can provide. Database 124 can store circuit load threshold conditions for CSP uplink circuit 130 and CSP uplink circuit 135 (established by the CSP, hosting data center 120, etc.). For example, the load threshold conditions can include a maximum bandwidth utilization, connection speed requirements, maximum load on a circuit, quality of service metrics, etc., for respective instances of CSP uplink circuit 130 and CSP uplink circuit 135.

In additional embodiments, database 124 stores identification information for users (e.g., client device 110) and CSP registration and subscription information for users. For example, database 124 stores an IP address (e.g., from a local domain name server LDNS and/or domain name server (DNS)) that is associated with client device 110 for utilization in identifying client device 110. In additional examples, database 124 stores information indicating which CSP client device 110 is registered with. In one scenario, database 124 stores an entry indicating that client device 110 is registered/subscribed to the CSP associated with CSP uplink circuit 130.

In example embodiments, load balancing program 200 dynamically manages the load on a plurality of CSP uplink circuits based on monitored data, in accordance with an embodiment of the present invention. In various embodiments, hosting data center 120 can utilize load balancing program 200 in combination with circuit monitor 122 to manage usage of CSP uplink circuit 130 and CSP uplink circuit 135. In various embodiments, load balancing program 200 operates as a controller for dynamically allocating user traffic corresponding to executing user requests. In additional embodiments, where hosting data center 120 is representative of multiple data centers, load balancing program 200 can operate to perform multi-site load balancing across a plurality of CSP uplink circuits (e.g., at least CSP uplink circuit 130 and CSP uplink circuit 135).

In example embodiments, CSP uplink circuit 130 and CSP uplink circuit 135 are representative of the bandwidth carrying circuits that hosting data center 120 provisions to carry application traffic for multiple CSPs. For example, CSP uplink circuit 130 corresponds to a first CSP and CSP uplink circuit 135 corresponds to a second CSP, where hosting data center 120 provides services for both the first CSP and the second CSP (i.e., the first CSP and the second CSP are tenants of hosting data center 120). In other embodiments, data processing environment 100 can include additional CSP uplink circuits, based on the services or capabilities offered by hosting data center 120. In example scenarios, CSP uplink circuit 130 and CSP uplink circuit 135 can be carrier-grade ethernet circuits (e.g., 10G (10 gigabit) ethernet, 10G multi-protocol label switching (MPLS) circuits, etc.) and corresponding architecture that can be provisioned to the CSPs. Further, CSP uplink circuit 130 and CSP uplink circuit 135 can be components of network 105 (depicted separately for the purposes of illustration).

In another embodiment, client device 110 is a subscriber of the CSP associated with CSP uplink circuit 130. Accordingly, when client device 110 requests to access content in Internet-accessible resources 140, hosting data center receives the request via CSP uplink circuit 130. Utilizing processing of load balancing program 200, hosting data center 120 dynamically determined whether to utilize CSP uplink circuit 130 or CSP uplink circuit 135 to facilitate transmission of the application traffic to execute the request, based on real-time user traffic information. In further aspects, CSP uplink circuit 130 and CSP uplink circuit 135 can be interconnected (as components of network 105) via the backbone (or core) network. For example, in response to load balancing program 200 determining to route application access through CSP uplink circuit 135, load balancing program 200 can route the application traffic from hosting data center (and Internet-accessible resources) accordingly, allowing client device to utilize CSP uplink circuit 135. In this example, the application traffic can pass through interconnect peer points (e.g., of network 105) between CSP uplink circuit 130 and CSP uplink circuit 135 to facilitate access for client device 110, in accordance with embodiments of the present invention.

In additional embodiments, Internet-accessible resources 140 can be representative of any form or application, service, or resource that is available for users (e.g., accessible to a user of client device 110) to access and utilize. In an example, Internet-accessible resources 140 includes a cloud storage application that the user of client device 110 can utilize. Accordingly, the user of client device 110 (e.g., via application 114) can request to access data stored in Internet-accessible resources 140. In this example, hosting data center 120 can facilitate processing of the request utilizing load balancing program 200, in accordance with embodiments of the present invention. In other example embodiments, Internet-accessible resources 140 can be located remote to hosting data center 120 (e.g., accessible via network communications), while hosting data center 120 dynamically manages user traffic for accessing Internet-accessible resources 140 via load balancing program 200 (e.g., client device 110 over CSP uplink circuit 130 or CSP uplink circuit 135).

Figure 2:
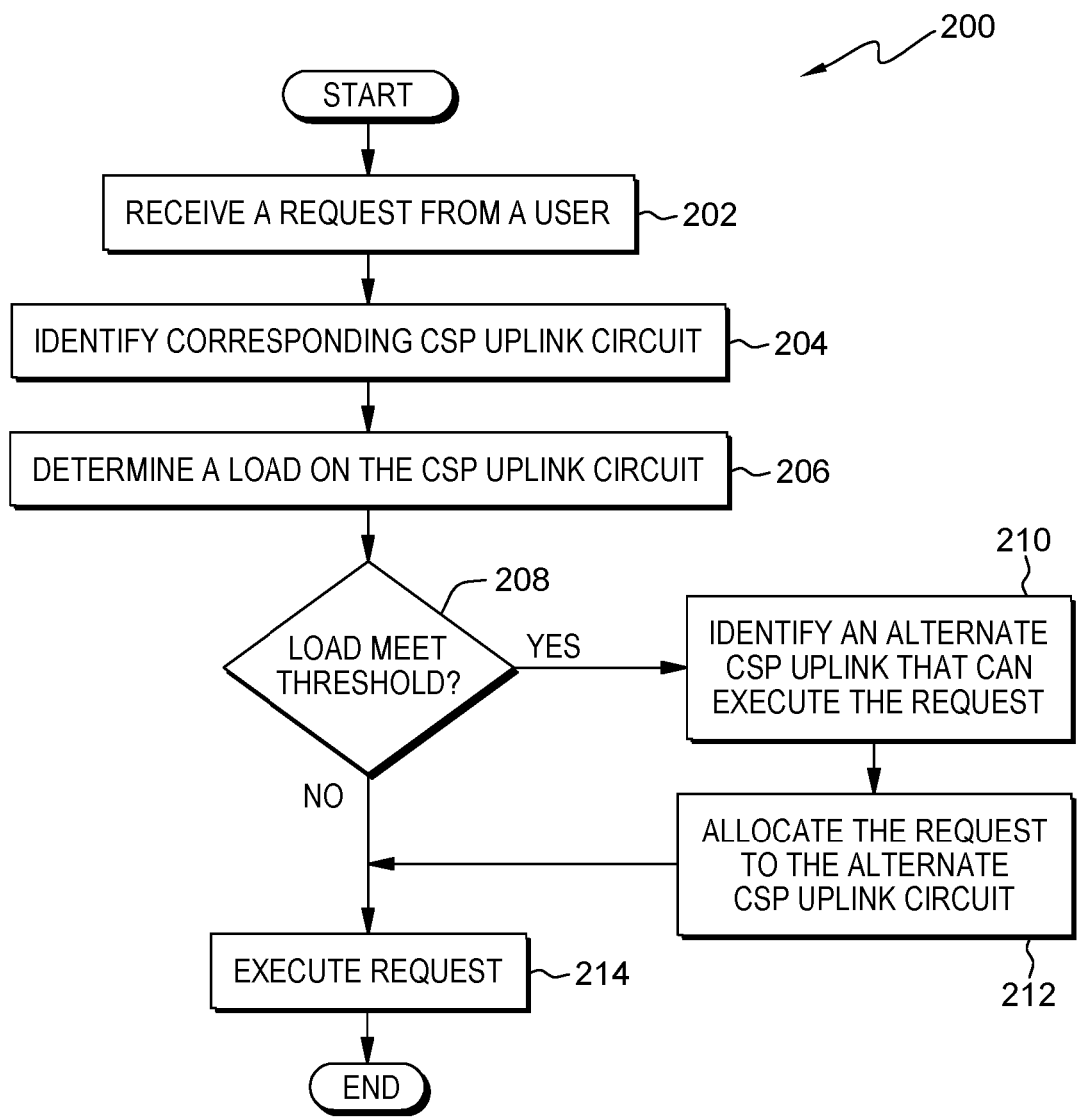
FIG. 2 is a flowchart depicting operational steps of a program for balancing user traffic across Internet circuits based on monitored loads of the circuits, in accordance with an embodiment of the present invention.

FIG. 2 is a flowchart depicting operational steps of load balancing program 200, a program for dynamic load balancing of user traffic across Internet circuits based on monitored loads of the circuits, in accordance with an embodiment of the present invention. In one embodiment, load balancing program 200 operates in conjunction with circuit monitor 122 to monitor usage loads on CSP uplink circuit 130 and CSP uplink circuit 135 and the corresponding capabilities to execute receives user requests. In an example embodiment, load balancing program 200 operates as a continuous process (e.g., a background process) on hosting data center 120. In another example embodiment, load balancing program 200 initiates in response to receiving a request (e.g., a DNS query, etc.) from a user associated with hosting data center 120 (e.g., client device 110).

In step 202, load balancing program 200 receives a request from a user. In one embodiment, load balancing program 200 receives a request from client device 110 to access content located in Internet-accessible resources 140. In various embodiments, client device 110 is associated with at least one CSP that hosting data center services (i.e., associated with the CSP corresponding to one of CSP uplink circuit 130 and CSP uplink circuit 135). For example, client device 110 is registered with and/or subscribed to a particular CSP (e.g., indicated in database 124). In example embodiments, a user request is a user-initiated application session from which a backend application server (e.g., of Internet-accessible resources 140) will be assigned.

In an example scenario, a user of client device 110 requests (e.g., via application 114) to access cloud storage. In this example scenario, the cloud storage is a component of Internet-accessible resources 140. Accordingly, load balancing program 200 receives the request to access the cloud storage from client device 110. In an additional aspect, the received request includes information indicating a respective CSP that corresponds to communications of client device 110.

In step 204, load balancing program 200 identifies a corresponding CSP uplink circuit. In one embodiment, load balancing program 200 analyzes the received request (from step 202) and information associated with client device 110 (e.g., in database 124) to determine whether client device 110 is associated with CSP uplink circuit 130 or CSP uplink circuit 135. In an example embodiment, load balancing program 200 identifies client device 110 and, based on information in database 124, determines which CSP client device 110 is registered with. For example, database 124 stores information indicating that client device 110 is registered with and/or subscribed to a particular CSP. Load balancing program 200 can then determine whether the CSP of client device 110 corresponds to CSP uplink circuit 130 or CSP uplink circuit 135.

In another example embodiment, load balancing program 200 can parse the received request from client device (received in step 202) to identify information indicating a corresponding CSP and/or instance of CSP uplink circuit 130 or CSP uplink circuit 135. In various embodiments, the received request can include metadata associated with executing/resolving the request. In an additional aspect, load balancing program 200 can identify a CSP corresponding to client device 110 based on an IP address associated with client device 110.

In the previously discussed example scenario, load balancing program 200 identifies the CSP of client device 110 (e.g., based on database 124, parsing the received request, etc.) and determines that client device 110 corresponds to the CSP that utilizes CSP uplink circuit 130. In alternate embodiments, hosting data center 120 can interface with more Internet uplink circuits than CSP uplink circuit 130 and CSP uplink circuit 135 (i.e., additional instances) and accordingly identify which Internet uplink circuit corresponds to client device 110.

In step 206, load balancing program 200 determines a load on the CSP uplink circuit. In one embodiment, load balancing program 200 determines a current load and quality of user traffic on the CSP uplink circuit that corresponds to the received request (identified in step 204). Load balancing program 200 can utilize circuit monitor 122 to gather real-time utilization information for CSP uplink circuit 130 and CSP uplink circuit 135. For example, circuit monitor 122 can periodically send a bandwidth utilization probe to one or more of CSP uplink circuit 130 and CSP uplink circuit 135 (e.g., in response to receiving a request from client device 110, at defined time intervals, etc.).

In various embodiments, circuit monitor 122 can collect the load and quality of user traffic traversing through CSP uplink circuit 130 and CSP uplink circuit 135 and send the collected information for storage in database 124 and/or utilization by load management program, in accordance with embodiments of the present invention. For example, circuit monitor 122 can determine and store various congestion metrics and information associated with CSP uplink circuit utilization, such as bandwidth utilization, connection speed, load on a circuit, quality of service metrics, etc.

In an example embodiment, load balancing program 200, in communication with circuit monitor 122, determines the real-time load on CSP uplink circuit 130. In a sample scenario, CSP uplink circuit 130 is a 10G (10 gigabit) ethernet circuit. In this scenario, load balancing program 200 can determine that the real-time load on CSP uplink circuit 130 as a percentage utilization of the allowable bandwidth (e.g., 25% bandwidth utilization), a current connection speed, etc.

In decision step 208, load balancing program 200 determines whether the determined load on the CSP uplink circuit meets a defined threshold. In one embodiment, load balancing program 200 determines whether the load on the CSP uplink circuit (determined in step 206) meets a defined threshold for user traffic on the CSP uplink circuit. In various embodiments, database 124 stores connectivity threshold information for CSP uplink circuit 130 and CSP uplink circuit 135 (e.g., bandwidth utilization threshold, user traffic speed threshold, percentage utilization threshold, etc.).

Load balancing program 200 can utilize threshold information that is defined by hosting data center 120 and/or respective CSPs of CSP uplink circuit 130 and CSP uplink circuit 135. In various embodiments, load balancing program 200 compares the determined load on the CSP uplink circuit (determined in step 206) with a load/usage threshold that corresponds to the CSP uplink circuit.

In the previously discussed example scenario, load balancing program 200 determined that client device 110 that provided the request (to access cloud storage) corresponds to the CSP that utilizes CSP uplink circuit 130. In this example scenario, load balancing program 200 and circuit monitor 122 determine the real-time load on CSP uplink circuit 130. In one example, load balancing program 200 determines that CSP uplink circuit 130 is currently experiencing 70% bandwidth utilization. In other examples, load balancing program 200 can determine the real-time connection speed for users utilizing CSP uplink circuit 130. Accordingly, in decision step 206 load balancing program 200 compares the determined real-time load (from step 206) to a defined threshold of CSP uplink circuit 130 (e.g., defined by the CSP). For example, load balancing program 200 compares the 70% bandwidth utilization of CSP uplink circuit 130 to the CSP-defined bandwidth utilization threshold of 60%.

In step 210, load balancing program 200 identifies an alternate CSP that can execute the request. More specifically, in response to determining that the determined load on the CSP uplink circuit meets the defined threshold (decision step 208, YES branch), load balancing program 200 identifies an alternate CSP, and corresponding CSP uplink circuit that can facilitate execution of the received request. In one embodiment, load balancing program 200 can utilize preferences stored in database 124 to determine candidates for alternate CSP uplink circuits. For example, database 124 can include a prioritized listing of CSP uplink circuits, utilization metric requirements for alternate CSP uplink circuits, etc.

In the depicted embodiment, where hosting data center 120 services CSP uplink circuit 130 and CSP uplink circuit 135, in response to determining that usage of CSP uplink circuit 130 exceeds a threshold condition (decision step 208, YES branch), load balancing program 200 identifies CSP uplink circuit 135 as the alternate (in step 210). In alternate embodiments, load balancing program 200 can determine real-time load information (e.g., bandwidth utilization) for a plurality of accessible CSP uplink circuits, and then determine the alternate CSP uplink accordingly (e.g., based on a lowest utilization, response time, associated priority indication, etc.).

In an additional embodiment, load balancing program 200 can identify the alternate CSP uplink circuit based on a dictate from one or more CSPs (e.g., CSP requirements and/or restrictions, etc.). In a further embodiment, if load balancing program 200 determines that all other accessible CSP uplink circuits have real-time utilization information that indicates a higher load than the CSP uplink circuit that corresponds to the received request, then load balancing program 200 can determine to not reallocate execution of the received request (e.g., proceed to step 214 without reallocation).

In step 212, load balancing program 200 allocates the request to the alternate CSP uplink circuit. In one embodiment, load balancing program 200 distributes the received request (from step 202) for execution on the alternate CSP uplink circuit (identified in step 210). In another embodiment, load balancing program 200 can allocate execution of a portion of the traffic for the request to the alternate CSP uplink circuit (or a portion of requests in a plurality of requests).

In the previously discussed example scenario, load balancing program 200 determined that CSP uplink circuit 130 corresponds to client device 110 and the received request (in step 204) and that the real-time traffic load on CSP uplink circuit 130 exceeds a specified congestion threshold (decision step 208, YES branch). Then, load balancing program 200 identifies CSP uplink circuit 135 as the alternate circuit (in step 210) for accessing the cloud storage in Internet-accessible resources 140. Accordingly, load balancing program 200 allocates execution of the received request to CSP uplink circuit 135 (i.e., user traffic to access the cloud storage).

In step 214, load balancing program 200 executes the request. In one embodiment, load balancing program 200 executes the received request (distributes user traffic) utilizing the alternate CSP uplink circuit. For example, since the real-time traffic load on CSP uplink circuit 130 meets the threshold condition, load balancing program 200 distributes the user traffic for satisfying the received request to CSP uplink circuit 135 (i.e., a circuit that does not exceed a usage threshold). In the previously discussed example scenario, load balancing program 200 (i.e., hosting data center 120) utilizes CSP uplink circuit 135 for the user traffic to access the cloud storage in Internet-accessible resources 140.

In another aspect, in response to determining that the determined load on the CSP uplink circuit does not meet the defined threshold (decision step 208, NO branch), load balancing program 200 executes the request. For example, load balancing program 200 since the real-time traffic load on CSP uplink circuit 130 does not meet the threshold condition, load balancing program 200 can distribute the user traffic for satisfying the received request to CSP uplink circuit 130 (i.e., the CSP uplink circuit that corresponds to the received request and client device 110).

Figure 3:
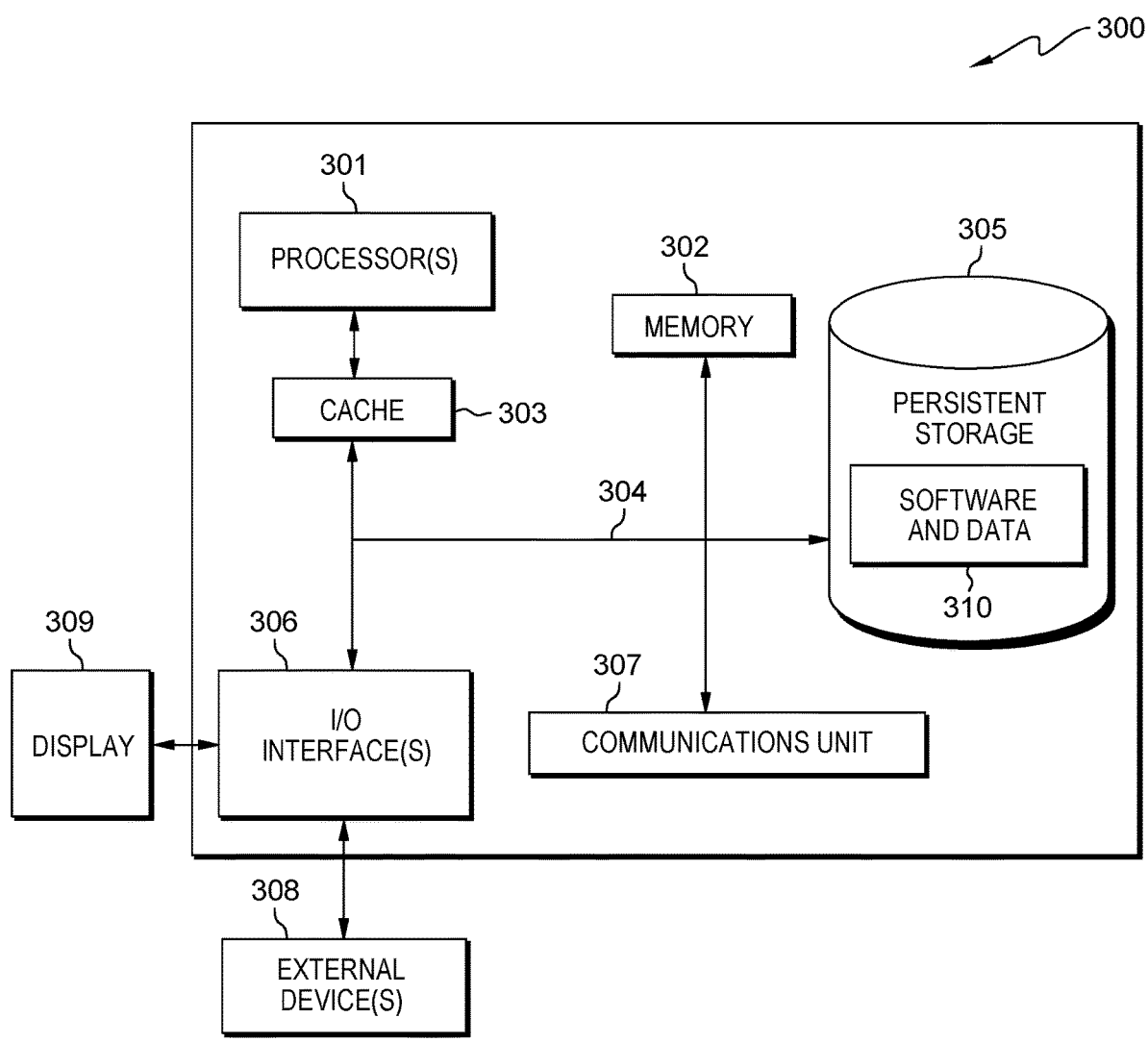
FIG. 3 depicts a block diagram of components of a computing system representative of the client device and hosting data center of FIG. 1, in accordance with an embodiment of the present invention.
Figure 4:
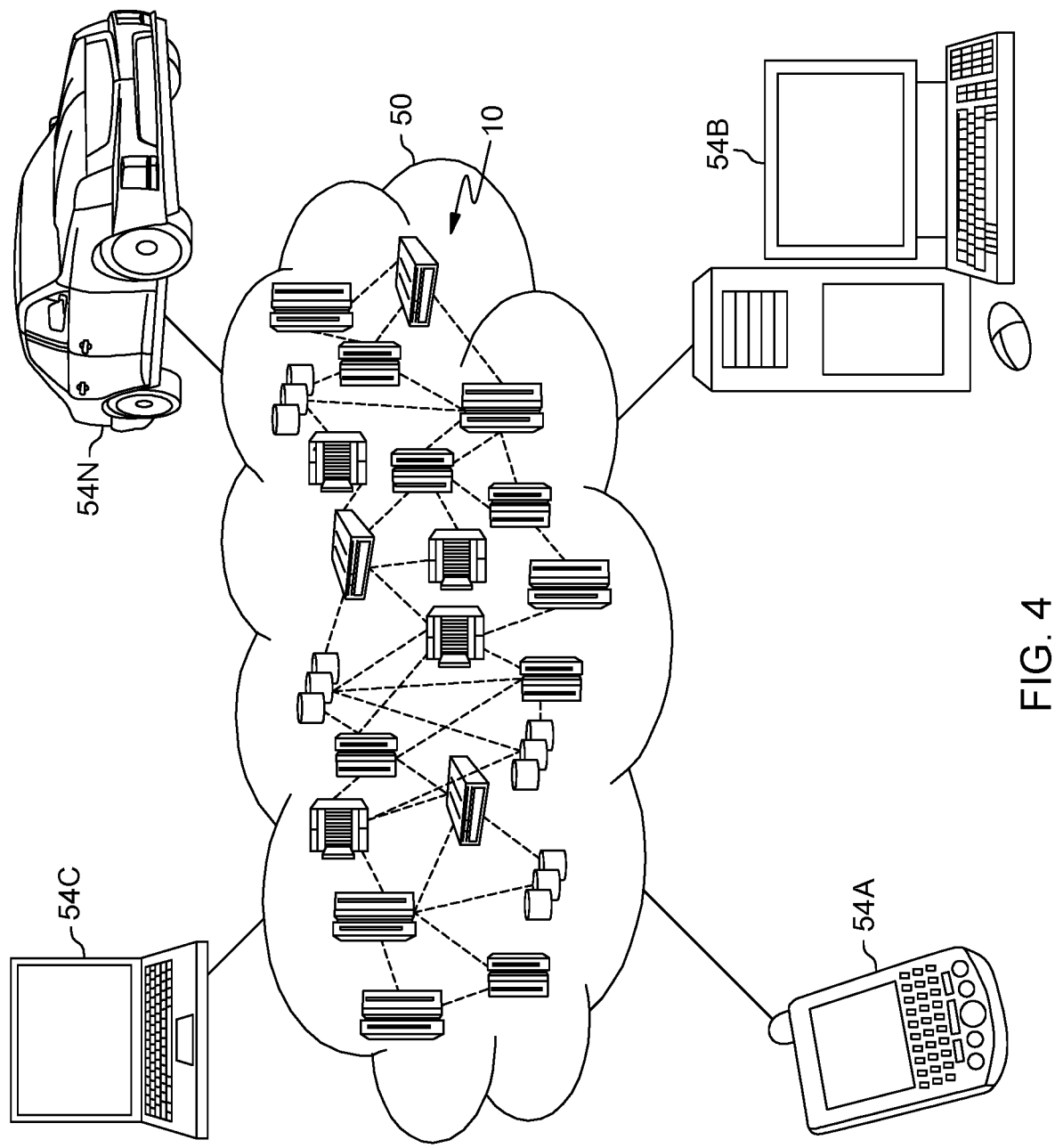
FIG. 4 depicts a cloud computing environment according to an embodiment of the present invention.

FIG. 3 depicts computer system 300, which is representative of client device 110 and hosting data center 120, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 110, software and data 310 includes user interface 112 and application 114. With respect to hosting data center 120, software and data 310 includes circuit monitor, database 124, and load balancing program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
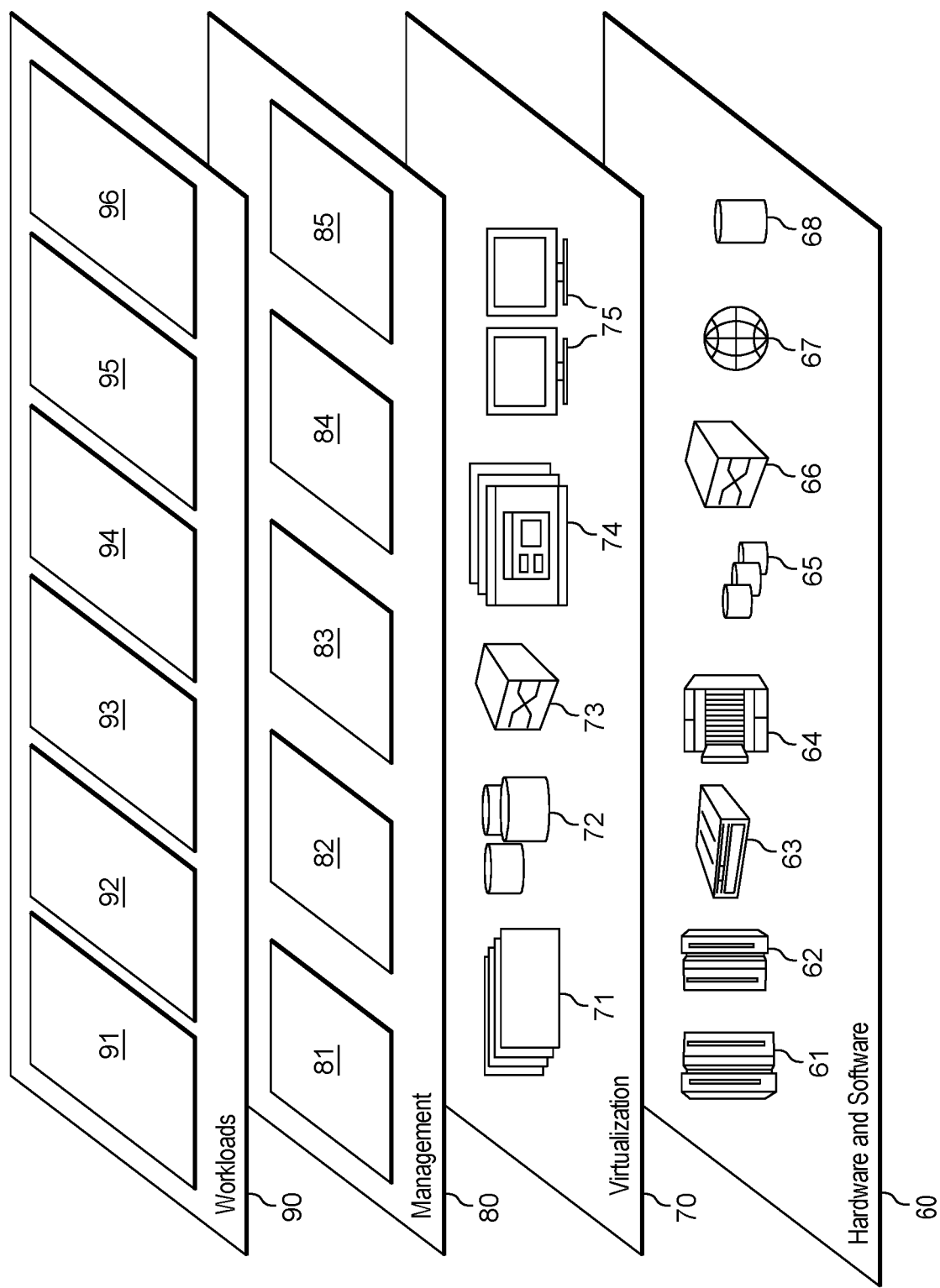
FIG. 5 depicts abstraction model layers according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software 96. In various embodiments of the present invention, software 96 is representative of load balancing program 200 and circuit monitor 122, or corresponding processing capabilities, described in further detail respectively with regard to FIG. 1 and FIG. 2.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a request to utilize an Internet-accessible resource from a first user;
   identifying, by one or more processors, a first communications service provider (CSP) that is associated with the user;
   determining, by one or more processors, a real-time load and quality of user traffic on a first Internet uplink circuit that is provisioned to the first CSP;
   determining, by one or more processors, whether the real-time load on the first Internet uplink circuit meets a threshold condition;
   in response to determining that the real-time load on the first Internet uplink circuit does meet the threshold condition and the quality of user traffic, distributing, by one or more processors, traffic corresponding to executing the received request to utilize the Internet-accessible resource to a second Internet uplink circuit that is provisioned to a second CSP;
   storing connectivity threshold information for the first CSP uplink circuit and the second CSP uplink circuit in a database for load management, including bandwidth utilization threshold, user traffic speed connection speed, load on a circuit, and metrics associated with quality of service and user traffic; and
   parsing a received request from a client device to identify information indicating the first CSP uplink circuit and the second CSP uplink circuit, the received request includes metadata associated with the request.

2. The method of claim 1, wherein the user is registered with the first CSP.

3. The method of claim 1, wherein the second CSP is different than the first CSP.

4. The method of claim 1, wherein determining the real-time load on the first Internet uplink circuit, further comprises:
   sending, by one or more processors, a bandwidth utilization probe to the first internet uplink circuit, and
   wherein the real-time load is selected from the group consisting of percentage bandwidth utilization, connection speed, load on circuit, and the quality of service.

5. The method of claim 1, wherein the request is for an application session with the Internet-accessible resource.

6. The method of claim 1, wherein distributing traffic corresponding to executing the received request further comprises:

determining, by one or more processors, respective real-time loads on a plurality of Internet uplink circuits that are respectively provisioned to a plurality of CSPs by a hosting data center; and identifying, by one or more processors, the second Internet uplink circuit as having a lowest real-time load.

7. The method of claim 1, wherein the first Internet uplink circuit and the second Internet uplink circuit are bandwidth carrying circuits that are provisioned to respective CSPs.

8. A computer program product comprising:
one or more computer readable storage media and program instructions stored on the one or more computer readable storage media, the program instructions comprising:
program instructions to receive a request to utilize an Internet-accessible resource from a first user;
program instructions to identify a first communications service provider (CSP) that is associated with the user;
program instructions to determine a real-time load and quality of user traffic on a first Internet uplink circuit that is provisioned to the first CSP;
program instructions to determine whether the real-time load on the first Internet uplink circuit meets a threshold condition and the quality of user traffic;
in response to determining that the real-time load on the first Internet uplink circuit does meet the threshold condition, program instructions to distribute traffic corresponding to executing the received request to utilize the Internet-accessible resource to a second Internet uplink circuit that is provisioned to a second CSP;
program instructions to collect the real-time load and quality of user traffic traversing through the first CSP uplink circuit and the second CSP uplink circuit and to send the collected information for storage in database and utilization by load management program, wherein the program instructions determine and store bandwidth utilization, connection speed, load on a circuit, and quality of service metrics; and
program instructions to parse a received request from a client device to identify information indicating the first CSP uplink circuit and the second CSP uplink circuit, the received request includes metadata associated with executing/resolving the request.

9. The computer program product of claim 8, wherein the user is registered with the first CSP.

10. The computer program product of claim 8, wherein the second CSP is different than the first CSP.

11. The computer program product of claim 8, wherein the program instructions to determine a real-time load on a first Internet uplink circuit further comprises program instructions to:
send a bandwidth utilization probe to the first internet uplink circuit, and
wherein the real-time load is selected from the group consisting of percentage bandwidth utilization, connection speed, load on circuit, and the quality of service.

12. The computer program product of claim 8, wherein the request is for an application session with the Internet-accessible resource.

13. The computer program product of claim 8, wherein the program instructions to distribute traffic corresponding to executing the received request further comprises program instructions to:
determine respective real-time loads on a plurality of Internet uplink circuits that are respectively provisioned to a plurality of CSPs by a hosting data center; and
identify the second Internet uplink circuit as having a lowest real-time load.

14. A computer system comprising:
one or more computer processors;
one or more computer readable storage media; and
program instructions stored on the computer readable storage media for execution by at least one of the one or more processors, the program instructions comprising:
program instructions to receive a request to utilize an Internet-accessible resource from a first user;
program instructions to identify a first communications service provider (CSP) that is associated with the user;
program instructions to determine a real-time load and quality of user traffic on a first Internet uplink circuit that is provisioned to the first CSP;
program instructions to determine whether the real-time load on the first Internet uplink circuit meets a threshold condition and quality of user traffic;
in response to determining that the real-time load on the first Internet uplink circuit does meet the threshold condition, program instructions to distribute traffic corresponding to executing the received request to utilize the Internet-accessible resource to a second Internet uplink circuit that is provisioned to a second CSP;
program instructions to collect the real-time load and quality of user traffic traversing through the first CSP uplink circuit and the second CSP uplink circuit and to send the collected information for storage in database and utilization by load management program, wherein the program instructions determine and store bandwidth utilization, connection speed, load on a circuit, and quality of service metrics;
program instructions to analyze a received request from a client device, the received request includes metadata associated with executing/resolving the request; and
program instructions to identify information which is stored in the database to determine that the client device is associated with the first CSP uplink circuit or the second CSP uplink circuit based on information stored in the database.

15. The computer system of claim 14, wherein the user is registered with the first CSP.

16. The computer system of claim 14, wherein the second CSP is different than the first CSP.

17. The computer system of claim 14, wherein the program instructions to determine a real-time load on a first Internet uplink circuit further comprises program instructions to:
send a bandwidth utilization probe to the first internet uplink circuit, and
wherein the real-time load is selected from the group consisting of percentage bandwidth utilization, connection speed, load on circuit, and the quality of service.

18. The computer system of claim 14, wherein the request is for an application session with the Internet-accessible resource.

19. The computer system of claim 14, wherein the program instructions to distribute traffic corresponding to executing the received request further comprises program instructions to:
determine respective real-time loads on a plurality of Internet uplink circuits that are respectively provisioned to a plurality of CSPs by a hosting data center; and
identify the second Internet uplink circuit as having a lowest real-time load.

20. The computer system of claim 14, wherein the first Internet uplink circuit and the second Internet uplink circuit are bandwidth carrying circuits that are provisioned to respective CSPs.

* * * * *